Feb. 15, 1927.  
E. A. HESTER  
ARC EXTINGUISHING DEVICE  
Filed June 17, 1920
1,617,390
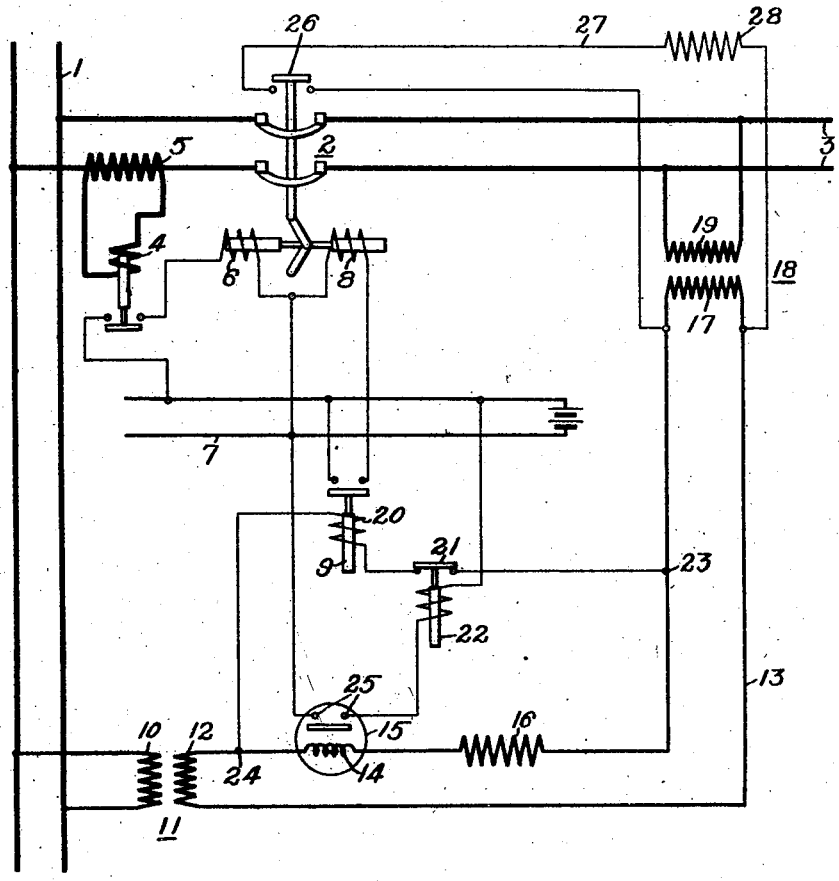
WITNESSES:  
J. A. Helsel  
J. M. Procter
INVENTOR  
Edgar A. Hester  
BY  
Wesley G. Carr  
ATTORNEY Patented Feb. 15, 1927.

1,617,390

UNITED STATES PATENT OFFICE.

EDGAR A. HESTER, OF BROOKLYN, NEW YORK, ASSIGNOR TO WESTINGHOUSE ELECTRIC & MANUFACTURING COMPANY, A CORPORATION OF PENNSYLVANIA.

ARC-EXTINGUISHING DEVICE.

Application filed June 17, 1920. Serial No. 389,609.

My invention relates to systems of distribution and particularly to apparatus for extinguishing arcs that occur in such systems.

One object of my invention is to provide means connected around an interrupter in a circuit, for controlling the reclosing of the same.

Another object of my invention is to provide means for neutralizing the connecting means around the interrupter when the latter is opened.

A further object of my invention is to provide a device of the above indicated character that shall be simple in construction and effective in its operation.

In practicing my invention, I provide a circuit interrupter between a main and a feeder circuit. Means is provided for tripping the interrupter when a fault obtains on the feeder circuit and means is also provided for reclosing the interrupter. The reclosing means is responsive to a drop in voltage across the interrupter which, of course, obtains only when the interrupter is open. In order to preclude the voltage from the main circuit from being impressed on the feeder circuit when the interrupter is opened, I provide a pallet switch for the interrupter which is adapted to close a circuit comprising a resistor across the terminals of the circuit around the interrupter. Since this circuit around the interrupter is provided with transformers that are employed to energize a control relay in accordance with the difference between the voltages of the main and the feeder circuits, the closure of the circuit comprising the resistor reduces the voltage of one of the transformers and thus precludes the impression of the main-circuit voltage on the feeder circuit when the interrupter is opened. This is essential, as the interrupter is supposed to open and close only a predetermined number of times in order to clear a fault and is precluded from reclosing if this fault is not removed after the lapse of a predetermined time period. If the main-circuit voltage continues to be impressed upon the feeder circuit, any arc that is drawn will be maintained because of the voltage impressed thereacross.

The single figure of the accompanying drawing is a diagrammatic view of an electric circuit embodying my invention.

A main circuit 1 is connected, through a circuit interrupter 2, to a feeder circuit 3. An overload relay 4 is connected to a series transformer 5 and is adapted to control the circuit of a trip coil 6 from an auxiliary circuit 7. The circuit interrupter 2 is provided with a closing coil 8 that is also supplied with energy from the circuit 7 and is controlled by a service-restoring relay 9.

The primary winding 10 of a potential transformer 11 is connected to the circuit 1, and a secondary winding 12 of the transformer is connected to a circuit 13 comprising a winding 14 of a time-limit relay 15, a resistor 16 and the primary winding 17 of the potential transformer 18. The secondary winding 19 of the transformer 18 is connected to the circuit 3.

The winding 20 of the service-restoring relay 9 is connected in series with contact members 21 of a relay switch 22, and the circuit thus constituted is connected, from a point 23 in the circuit 13, to a point 24 therein.

Contact members 25 of the relay 15 are connected in circuit with the winding of the switch 22, and the circuit thus constituted is connected across the control circuit 7. The contact members are actuated to complete the circuit, after the relay is energized for a predetermined time interval, against a spring that normally maintains such contact members disengaged.

The circuit interrupter 2 is provided with a pallet switch 26 that is adapted to complete a circuit 27 comprising a resistor 28 from one terminal of the transformer winding 17 to the other terminal thereof only when the circuit interrupter 2 is opened.

When a fault, such as an arc or an arcing ground, obtains on the circuit 3, sufficient current will traverse the transformer 5 to so energize the overload relay 4 as to close the circuit through the trip coil 6 of the interrupter to thus trip the same.

When the circuit interrupter 2 is opened, the arc will be extinguished because substantially no voltage is available to maintain the same.

With such devices as have heretofore been constructed, it was usual to reclose the interrupter immediately after it opened which reclosing was controlled by a difference in potential across the terminals of the interrupter. This method did not provide means for removing the voltage from the feeder circuit and, consequently, the arc usually persisted because of the voltage maintaining the same.

In view of the above, I have provided a pallet switch 26 which so close-circuits the winding 17 of the transformer 18 as to preclude the impression of any material voltage on the circuit 3 through the circuit 13 when the interrupter 2 is open.

Under normal operations, when the interrupter 2 opens, there will be sufficient voltage impressed across the points 23 and 24 of the circuit 13, while the interrupter 2 is opening, to energize the winding 20 of the service-restoring relay 9. This will effect the energization of the closing coil 8 to reclose the interrupter 2. While the interrupter 2 is closed the voltages of the transformers 11 and 18 balance and the winding 14 of the relay 15 is not energized. Upon the opening of the interrupter 2, the winding 14 of the relay 15 is energized since the winding 17 of the transformer 18 is short-circuited and, as the moving member of the relay 15 is non-restrained in its operation, it will move a predetermined distance each time the winding 14 is energized. The relay 15 is so arranged that, after the winding 14 has been energized a predetermined number of times, which is usually sufficient to extinguish any normal arc on the system, the contact members 25 are closed to so energize the winding of the switch 22 as to disengage the contact members 21 thereof and thus de-energize the winding 20 of the relay 9. The movable contact members 21 of the switch 22 are held in their open position by the continued energization of the winding 22 until the fault is removed from the circuit and the interrupter 2 is reclosed.

It will be understood that the pallet switch 26 does not close the circuit 27 until the circuit interrupter 2 is completely opened. A sufficient time is provided to permit the relay 9 to function before the drop of potential is reduced. Since the resistor 28 is of such resistance as to effectively short circuit the winding 17, insufficient voltage is impressed on the circuit 3 when the circuit interrupter 2 is opened to maintain an arc in the circuit 3.

My invention is not limited to the specific arrangements illustrated as it may be variously modified without departing from the spirit and scope of the invention, as set forth in the appended claims.

I claim as my invention:—

1. The combination with two circuits, an interrupter therebetween and means for tripping the interrupter when a fault obtains on one circuit, of means connected between the two circuits for controlling the reclosing of the interrupter, and means for short circuiting a portion of said means connected between the two circuits when the interrupter is open.

2. The combination with two circuits, an interrupter therebetween and means for tripping the interrupter when a fault obtains on one circuit, of a relay connected between said circuits that is energized when the interrupter is open for the purpose or reclosing the same, and means for precluding the impression of the one circuit potential on the other circuit when the interrupter is open.

3. In a system of distribution, the combination with a circuit interrupter, means for opening it when a fault obtains on the system, a relay, means for connecting the relay to the supply and line circuits and means including the relay for effecting the reclosure of the interrupter after it opens, of means for precluding the impression of voltage on the line side of the interrupter through the relay connecting means when the interrupter is open.

4. The combination with a main circuit, a feeder circuit, an interrupter therebetween and means for tripping the interrupter when a fault obtains in the feeder circuit, of transformers connected between the circuits, a reclosing relay connected to said transformers, and means for close-circuiting one of said transformers when the interrupter is open.

5. The combination with a main circuit, a feeder circuit, an interrupter therebetween and means for tripping the interrupter when a fault obtains in the feeder circuit, of transformers connected between the circuits, a reclosing relay controlled by said transformers, and means actuated by the interrupter for close-circuiting the terminals of one of the transformers under predetermined conditions.

6. The combination with a main circuit, a feeder circuit, an interrupter therebetween and means for tripping the interrupter when a fault obtains in the feeder circuit, of a circuit for operatively connecting the two circuits, a transformer at each end of the connecting circuit, a reclosing relay connected to the connecting circuit, and means for close-circuiting the terminals of one of the transformers when the interrupter is open.

7. The combination with a main circuit, a feeder circuit, an interrupter therebetween and means for tripping the interrupter when a fault obtains in the feeder circuit, of a circuit for operatively connecting the two circuits, a transformer at each end of the connecting circuit, a reclosing relay connected to the connecting circuit, and a pallet switch operatively connected to the interrupter for close-circuiting the terminals of one of the transformers under predetermined conditions.

8. The combination with a main circuit, a feeder circuit, an interrupter therebetween and means for tripping the same, of a potential transformer connected to each of the circuits, a circuit connected between the transformers, means connected to said transformer-connecting circuit for controlling the closing of the interrupter, a resistor, and means for connecting the resistor across the terminals of one transformer when the interrupter is open.

9. The combination with two circuits and means connected therebetween to be operated upon the occurrence of abnormal conditions in one circuit, of energy-transferring means connected between the two circuits, and means including a switch for controlling the same to preclude the normal circuit from so influencing the abnormal circuit as to create a manifestation of apparent normality in the abnormal circuit, while the energy-transferring means are still connected between the circuits.

10. The combination with two associated circuits, of means connected therebetween responsive to a variation from a predetermined relation of corresponding electrical conditions of the circuits, and means including a short-circuiting switch for precluding one circuit from influencing the other circuit through said means to cause said other circuit to manifest apparently corresponding conditions when the conditions of said other circuit have varied from the predetermined relation between the corresponding conditions of both circuits.

11. In a system of distribution, the combination with a circuit-interrupter, means for opening said interrupter when a fault obtains on the system, two opposing transformers connected together and to said system on opposite sides of said interrupter, means including said transformers for reclosing said interrupter, and means for limiting the transfer of energy through said transformers in shunt to said interrupter when the same is open.

In testimony whereof, I have hereunto subscribed my name this 7th day of June, 1920.

EDGAR A. HESTER.